United States Patent
Chai et al.

(10) Patent No.: US 9,936,414 B2
(45) Date of Patent: Apr. 3, 2018

(54) ENABLING LONG-TERM-EVOLUTION/WIFI COEXISTENCE

(71) Applicant: NEC Laboratories America, Inc., Princeton, NJ (US)

(72) Inventors: Eugene Chai, Monmouth Junction, NJ (US); Mohammad Khojastepour, Lawrenceville, NJ (US); Sampath Rangarajan, Bridgewater, NJ (US); Karthikeyan Sundaresan, Manalapan, NJ (US); Krishna Garikipati, Ann Arbor, MI (US)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 15/270,864

(22) Filed: Sep. 20, 2016

(65) Prior Publication Data
US 2017/0094546 A1   Mar. 30, 2017

Related U.S. Application Data

(60) Provisional application No. 62/232,911, filed on Sep. 25, 2015.

(51) Int. Cl.
| | |
|---|---|
| H04W 24/10 | (2009.01) |
| H04W 48/18 | (2009.01) |
| H04W 72/04 | (2009.01) |
| H04W 72/08 | (2009.01) |
| H04W 16/14 | (2009.01) |

(Continued)

(52) U.S. Cl.
CPC ........... *H04W 24/10* (2013.01); *H04W 16/14* (2013.01); *H04W 48/18* (2013.01); *H04W 72/0446* (2013.01); *H04W 72/082* (2013.01); *H04W 74/0816* (2013.01); *H04W 72/1215* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2015/0351121 A1* | 12/2015 | Luo | ................... | H04W 72/1273 370/329 |
| 2016/0212768 A1* | 7/2016 | Wentink | .................. | H04L 47/27 |
| 2017/0251442 A1* | 8/2017 | Kalhan | ............... | H04W 56/001 |

OTHER PUBLICATIONS

Almedia, et al., "Enabling LTE/WiFi Coexistence by LTE Blank Subframe Allocation", IEEE ICC 2013—Wireless Communications Symposium, Jan. 2013, pp. 5083-5088.

\* cited by examiner

*Primary Examiner* — Hong Cho
(74) *Attorney, Agent, or Firm* — Joseph Kolodka

(57) ABSTRACT

Systems and methods for improving Long Term Evolution (LTE)-WiFi coexistence in a network, including configuring one or more LTE nodes for asynchronous access and synchronous transmission to bridge LTE and WiFi access modes. A channel is reserved for LTE transmission in the one or more LTE nodes, and a supplementary WiFi module is provided in the one or more LTE nodes for sensing the channel for occupancy and for broadcasting a reservation signal on the channel prior to the LTE transmission. Contention window sizes are scaled linearly by increasing the contention window sizes proportionally to a subframe collision rate to maintain throughput fairness to the WiFi, and synchronous transmission from the one or more LTE nodes to one or more User Devices (UEs) is performed by activating the unlicensed carrier for a reserved time period.

20 Claims, 8 Drawing Sheets

(51) Int. Cl.
*H04W 74/08* (2009.01)
*H04W 84/04* (2009.01)
*H04W 84/12* (2009.01)
*H04W 72/12* (2009.01)

ENABLING LONG-TERM-EVOLUTION/WIFI COEXISTENCE

RELATED APPLICATION INFORMATION

This application claims priority to provisional application No. 62/232,911 filed Sep. 25, 2015, the contents of which is incorporated herein by reference.

BACKGROUND

Technical Field

The present invention relates generally to mobile communications and networking, and more particularly, to enabling Long Term Evolution (LTE)/WiFi coexistence for mobile communications and data transport.

Description of the Related Art

Bringing Long Term Evolution (LTE) to the unlicensed spectrum is necessary to meet the unprecedented demands faced by operators from ubiquitous, bandwidth-hungry mobile services/applications. However, the access paradigms in LTE (centralized/synchronous) and WiFi (distributed/asynchronous) are fundamentally incompatible. LTE is not designed to yield the channel to WiFi, and may potentially starve WiFi of bandwidth. While simple on-off duty access mechanisms for LTE are a conventional industry means to tackle this challenging coexistence problem, there are several artifacts inherent to LTE transmissions that render such mechanisms ineffective.

Two approaches are currently being developed to support LTE in the unlicensed spectrum: LTE-Unlicensed (LTE-U) and Licensed Assisted Access LTE (LAA-LTE). LTE-U requires no changes to the existing LTE standards, and uses adaptive on-off duty cycling of the LTE channel. LTE-U relies on channel sensing to dynamically adjust the on- and off-durations according to the measured WiFi utilization of the channel. The on-duration, typically on the order of hundreds of milliseconds, is suitable for LTE-to-LTE coexistence, but is too coarse-grained to maintain short-term fairness between LTE and WiFi. Thus, resulting in severely degraded LTE and WiFi transmissions, and in a complete loss of connectivity in various instances.

SUMMARY

A computer implemented method for improving Long Term Evolution (LTE)-WiFi coexistence in a network, including configuring one or more LTE nodes for asynchronous access and synchronous transmission to bridge LTE and WiFi access modes. A channel is reserved for LTE transmission in the one or more LTE nodes, and a supplementary WiFi module is provided in the one or more LTE nodes for sensing the channel for occupancy and for broadcasting a reservation signal on the channel prior to the LTE transmission. Contention window sizes are scaled linearly by increasing the contention window sizes proportionally to a subframe collision rate to maintain throughput fairness to the WiFi. and synchronous transmission from the one or more LTE nodes to one or more User Devices (UEs) is performed by activating the unlicensed carrier for a reserved time period.

A system for improving Long Term Evolution (LTE)-WiFi coexistence in a network, including one or more LTE nodes configured for asynchronous access and synchronous transmission to bridge LTE and WiFi access modes. A channel scheduler reserves a channel for LTE transmission in the one or more LTE nodes, and a supplementary WiFi module in the one or more LTE nodes senses the channel for occupancy and for broadcasting a reservation signal on the channel prior to the LTE transmission. A scaler scales contention window sizes linearly by increasing the contention window sizes proportionally to a subframe collision rate to maintain throughput fairness to the WiFi. A transmitter performs synchronous transmission from the one or more LTE nodes to one or more User Devices (UEs) by activating the unlicensed earner for a reserved time period.

A non-transitory computer-readable storage medium including a computer-readable program for improving Long Term Evolution (LTE)-WiFi coexistence in a network by configuring one or more LTE nodes for asynchronous access and synchronous transmission to bridge LTE and WiFi access modes. A channel is reserved for LTE transmission in the one or more LTE nodes, and a supplementary WiFi module is provided in die one or more LTE nodes for sensing the channel for occupancy and for broadcasting a reservation signal on the channel prior to the LTE transmission. Contention window sizes are scaled linearly by increasing the contention window sizes proportionally to a subframe collision rate to maintain throughput fairness to the WiFi, and synchronous transmission from the one or more LTE nodes to one or more User Devices (UEs) is performed by activating the unlicensed carrier for a reserved time period.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
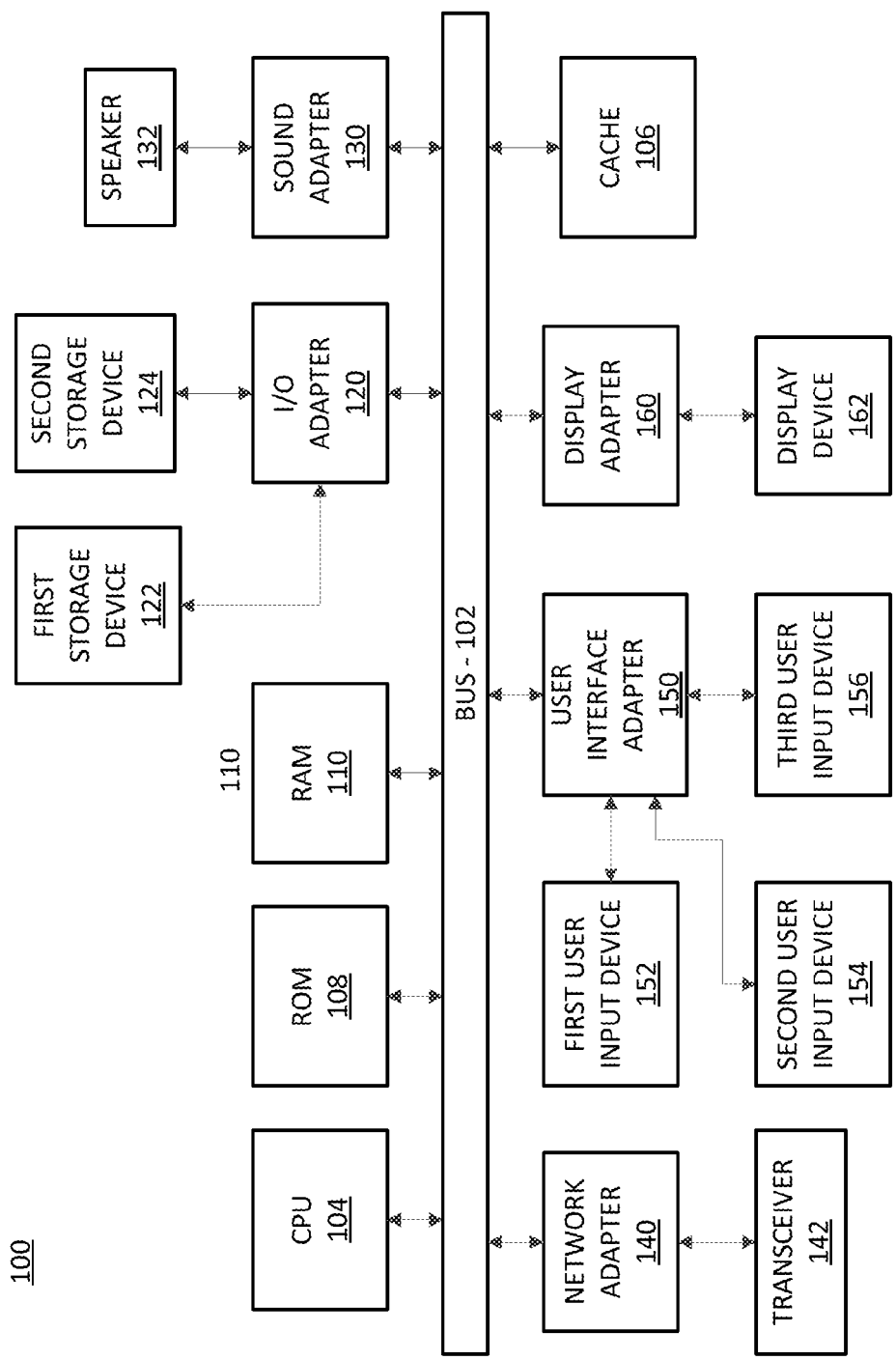
FIG. 1 is a block/flow diagram illustrating an exemplary processing system to which the present principles may be applied, in accordance with the present principles.

In accordance with various embodiments of the present principles, systems and methods are provided for enabling Long Term Evolution and WiFi coexistence.

In a particularly useful embodiment, a system and method for enabling efficient and fair coexistence for unlicensed LTE and WiFi, using current protocols (e.g., without requiring any modifications to either the LTE or WiFi protocols) is provided in accordance with the present principles.

In one embodiment, the present principles may be employed as a practical solution for enabling LTE/WiFi coexistence. In some embodiments, such enablement is provided using a coexistence protocol that employs the novel policy of asynchronous access and synchronous transmission (A2TS) for LTE to bridge the paradigm gap in accordance with the present principles. LTE may contend asynchronously for access to the channel in a manner that is efficient and fair to WiFi, while preserving the compliance and benefits of synchronous transmissions in LTE. The system and method according to the present principles may be readily implemented and deployed with off-the-shelf LTE and WiFi platforms without protocol modifications in accordance with various embodiments.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter ISO, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 100, 200, 300, 400, 600 and 800, described with respect to FIGS. 1, 2, 3, 4, 6, and 8, respectively, are systems for implementing respective embodiments of the present principles. Part or all of processing system 100 may be implemented in one or more of the elements of systems 200, 300, 400, 600, and 800, according to various embodiments of the present principles.

Further, it is to be appreciated that processing system 100 may perform at least part of the method described herein including, for example, at least part of methods 200, 300, 400, and 500 of FIGS. 2, 3, 4, and 5. Similarly, part or all of system 200, 300, 400, and 600 may be used to perform at least part of methods 200, 300, 400, 500, 600, and 700 of FIGS. 2, 3, 4, 5, 6, and 7, according to various embodiments of the present principles.

Figure 2:
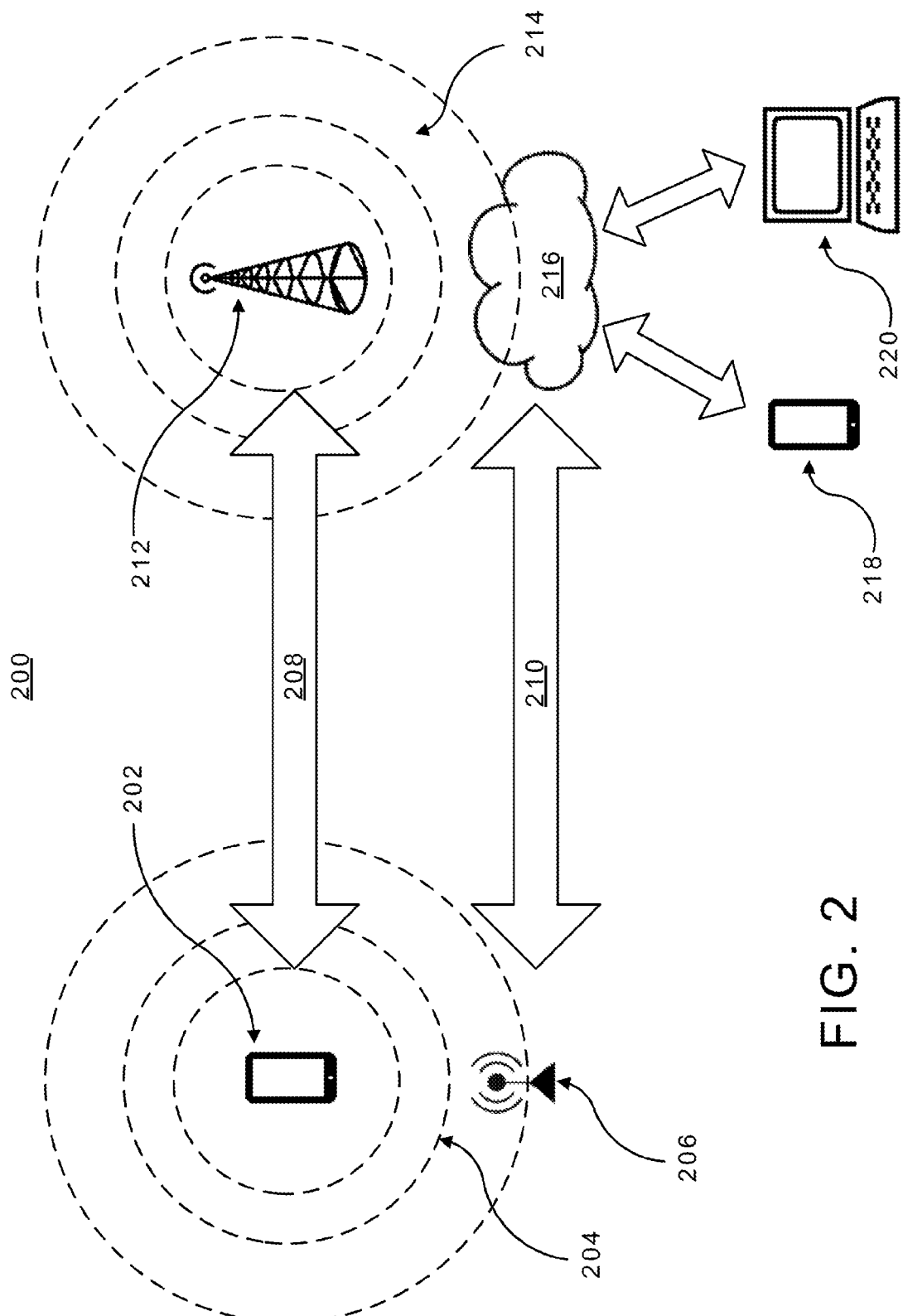
FIG. 2 shows a diagram of an exemplary system/method for data transport including instances of LTE/WiFi interference, in accordance with an embodiment of the present principles.

Referring now to FIG. 2, a block diagram showing a system/method 200 for data transport including exemplary instances of LTE/WiFi interference is illustratively depicted in accordance with an embodiment of the present principles. In one embodiment, a wireless communication device 206 (e.g., access point (AP), may communicate wirelessly 210 across a network 216 with a plurality of types of wireless devices 218, 220. In some embodiments, although the communication 210 may be performed within the appropriate wireless channel bands (e.g., ISM bands), a nearby LTE device 202 may also communicate with a base station 212 across an LTE channel 208. Radio-frequency signals 204, 214 from the LTE device 202 and the base station 212 may interfere with the AP's 206 ability to communicate with the wireless devices 218, 220. For example, the access point may seek to communicate on channels including frequencies that may be close enough to the LTE band that interference results.

Although depicted as distinct devices, it is to be appreciated that the interfering LTE device 202 may be the same as one of the other wireless devices 218, 220 communicating across the wireless network 216 in accordance with various embodiments of the present principles.

For example, in some embodiments, a smartphone device (e.g., 218) may enable simultaneous LTE and wireless communications within a same device 218. Thus, an access point 212 may be attempting to communicate with a particular device (e.g., 218) on a Wi-Fi channel, but the device 218 itself may be the cause of LTE/WiFi interference on the network 140 in accordance with various embodiments.

Figure 3:
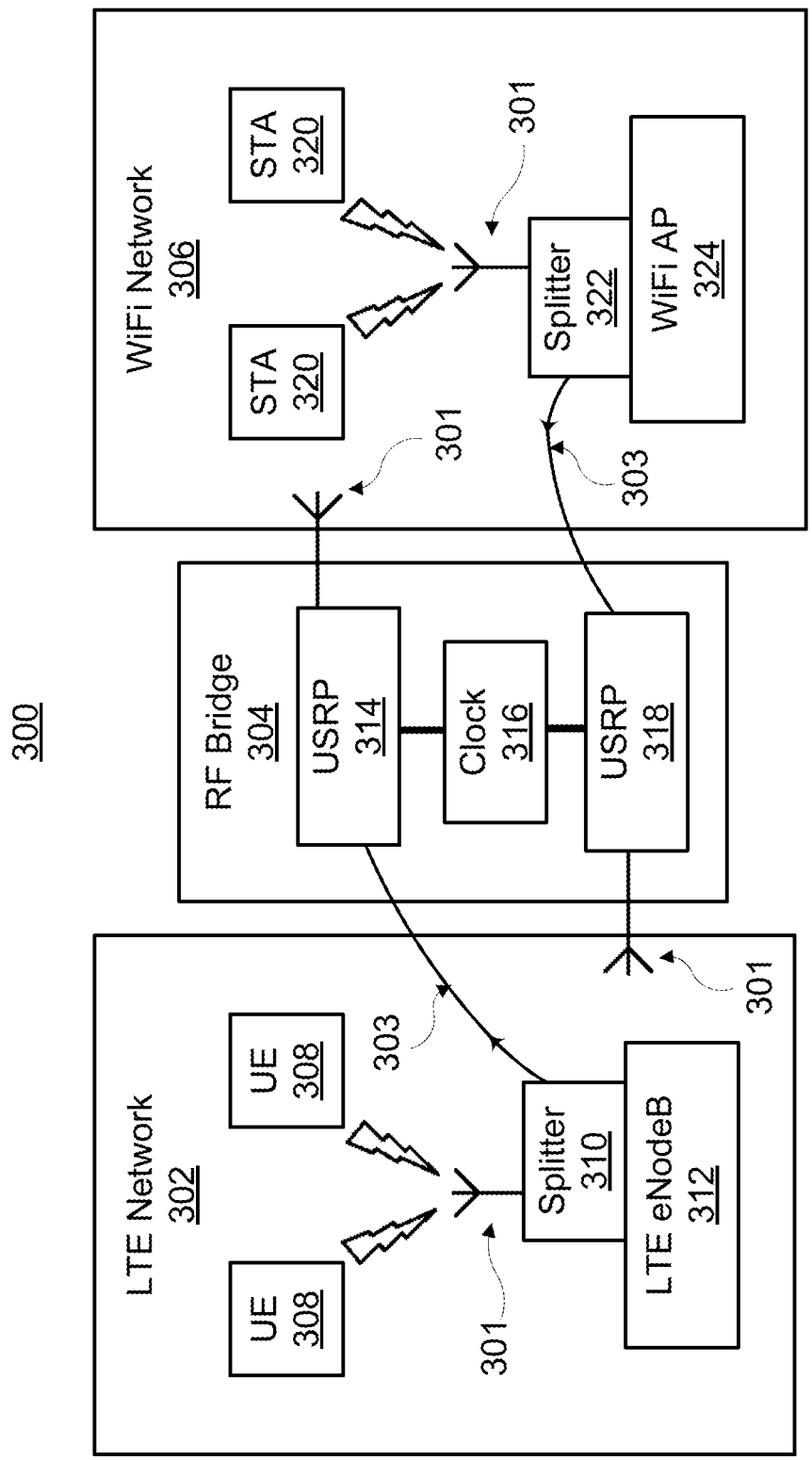
FIG. 3 shows a diagram of a system/method for data transport with Long Term Evolution (LTE)/WiFi coexistence, in accordance with an embodiment of the present principles.

Referring now to FIG. 3, a block diagram showing a high level system and method for enabling LTE/WiFi coexistence is illustratively depicted using an exemplary testbed 300 in accordance with an embodiment of the present principles.

Before describing various embodiments of the present principles in detail, some background on challenges faced when enabling LTE/WiFi coexistence, and failings of conventional systems to address the challenges and provide efficient, reliable connectivity in the presence of LTE and WiFi networks. Operating LTE in the unlicensed spectrum has recently received enthusiastic support from the industry to boost the capacity and coverage of LTE networks. This approach allows operators to maintain the same hack-end infrastructure while augmenting the licensed LTE spectrum with bandwidth from the unlicensed spectrum through a process called carrier aggregation.

Before deploying LTE into the unlicensed spectrum, it should be ensured that LTE will coexist fairly with both the WiFi networks that are currently dominant in those frequencies, as well as other LTE networks in the same unlicensed band. However, LTE relies on a synchronous, centrally managed channel access model. This is both incompatible with the distributed asynchronous model of WiFi, and not conducive for coexistence with other competing LTE networks.

Two approaches are currently being developed to support LTE in the unlicensed spectrum (e.g., LTE-Unlicensed (LTE-U) and Licensed Assisted Access LTE (LAA-LTE)). LTE-U requires no changes to the existing LTE standards, and uses adaptive on-off duty cycling of the LTE channel. LTE-U relies on channel sensing to dynamically adjust the on- and off-durations according to the measured WiFi utilization of the channel. The on-duration, typically on the order of hundreds of milliseconds, is suitable for LTE-to-LTE coexistence, but is too coarse-grained to maintain short-term fairness between LTE and WiFi. LAA-LTE may improve on the short-term WiFi fairness by allowing the LTE channel to be activated for shorter periods of 1-10 ms intervals. LAA-LTE uses Listen-Before-Talk (LBT) that relies on Clear Channel Assessment (CCA) before LTE subframes are transmitted. Unlike LTE-U, LAA-LTE requires modifications to LTE air interface standard.

However, both LTE-U and LAA-LTE encounter several fundamental challenges that threaten the feasibility of operating LTE in the unlicensed spectrum. For example, one challenge faced may include low sensitivity. Under the current European Telecommunications Standards Institute (ETSI) specifications, LBT only detects WiFi signal energy above −60 dBm. This is similar to the WiFi energy-detection of LTE signals which uses a CCA threshold of −62 dBm. However, both LTE and WiFi networks can successfully operate at signal levels of −80 dBm and lower. However, interference energy below the CCA threshold will still severely degrade LTE and WiFi transmissions, and can result in a complete loss of connectivity.

In some embodiments, another challenge faced may include accounting for transmission gaps. LTE frame transmissions include inherent gaps in the time domain, as no continuous source of signal energy is provided, even during its active period. These non-deliberate transmission gaps come from the control and data parts of the frame. It is challenging to minimize data gaps in light of the large number of concurrent users and the heterogeneity inherent in LTE traffic. However, it is even more difficult to eliminate control gaps without negatively affecting the operation of the network using conventional systems and methods.

For example, the number of concurrent users that can be scheduled depends on the size of the control channels. Hence, eliminating the control gaps by removing the control channels completely will reduce the benefits from user multiplexing. Further, when the control channels are active, it is necessary to keep pans of them unused to minimize intercell interference (e.g. as part of inter-cell interference/coordination procedures). Unfortunately, these LTE time gaps are typically much larger than WiFi slot duration (9 μs). Thus it is easy for WiFi or LAA-LTE using LBT to misinterpret these gaps as transmission opportunities, resulting in WiFi-LTE and LTE-LTE collisions.

In some embodiments, another challenge for enabling LTE/WiFi coexistence may include LTE-to-LTE Coexistence Timescales. There is an inherent conflict in the optimal timescales at which LTE-to-LTE and LTE-to-WiFi coexistence operate. LTE-to-WiFi coexistence benefits (in terms of fairness) from the short on/off periods of LAA-LTE. However, when there is little or no WiFi activity, LTE-to-LTE coexistence may be better served with longer on-periods. For example, LTE mechanisms such as resource/frequency management, semi-persistent scheduling, QoS management etc. operate at coarse time scales (e.g., seconds). The fast on-off nature of LBT in LAA-LTE is not conducive for such mechanisms. Hence, in the case of LTE-to-LTE coexistence, it may be beneficial for the on-duration to be, for example, hundreds of milliseconds to several seconds. However, using such long time periods also increase the probability of data and control gaps, which in turn increases the interference between LTE cells from different operators. Note that the prevalence of 5 GHz channels coupled with little to no WiFi activity in some of them (e.g. the DFS bands) may create scenarios where LTE-to-LTE coexistence is the dominant phenomenon.

The present principles may be employed to overcome these challenges, and to enable LTE and WiFi to coexist efficiently and maintain fair sharing of the unlicensed spectrum, while being completely standards-compliant, in accordance with various embodiments, which will be described in further detail herein below.

In one embodiment, a system and method including a testbed 300 may be constructed and employed to enable off-the-shelf LTE and WiFi devices to coexist over the same frequency spectrum. The testbed 300 may include separate LTE 302 and WiFi 306 networks, and may employ a bi-directional Radio Frequency (RF) bridge 304 that may forward RF signals between these two networks 302, 306. Hence, although current (commercial) LTE basestations 312 (e.g., eNodeBs) and User Equipment 308 (UE) do not conventionally operate on the unlicensed spectrum, enabling coexistence of commercial LTE and WiFi networks in accordance with various embodiments of the present principles may be illustrated using the testbed 300 (e.g., characterizing the nature of the LTE time gaps and channel sensing thresholds that lie at the heart of the coexistence problem, along with their impact on performance).

In some embodiments, efficient and reliable LTE/WiFi coexistence may be provided by accounting for a main source of the coexistence problem, namely the fundamental difference in the access modes of WiFi (distributed and asynchronous) and LTE (centralized and synchronous) in accordance with the present principles. The difference may be bridged by enabling the LTE node to access asynchronously (e.g., in a manner that is compatible with, and fair to the WiFi nodes) but transmit synchronously (e.g., retaining compliance and benefits of synchronous LTE) in the unlicensed spectrum. For simplicity of illustration, this novel mode of LTE operation in accordance with the present principles will be referred to as A2TS herein below.

In some embodiments, the present principles may be employed to leverage the growing trend of LTE small-cells being equipped with both LTE and WiFi interfaces. For example, for each unlicensed carrier in LTE, a supplementary WiFi interlace may be employed on an eNodeB 312 only for the purpose of contention (e.g., access) on the same channel. Once die WiFi interface gains access to the channel, it may broadcast a Clear-to-Send (CTS)-to-Self with the Network Allocation Vector (NAV) field set to the duration of the LTE transmission. The LTE interface then may activate the unlicensed carrier on the same frequency band and may begin synchronous transmission to its UEs during this reserved period in accordance with the present principles.

In some embodiments, the system and method according to the present principles may only be deployed on the eNodeB 312, and as such, does not require any changes to the other LTE UEs 308 or WiFi 324, 320 devices. Enabling A2TS using a WiFi interface serves to directly address key challenges (described above) pertinent to unlicensed LTE. The use of the WiFi interface for notification and sensing further enables preamble detection-based channel sensing, thereby increasing sensitivity to, for example, −82 dB, to mitigate interference from low-powered transmissions. Channel reservation in accordance with the present principles (e.g., via the CTS-to-Self) may prevent WiFi/LTE interference, even during the time-gaps in LTE transmissions.

In art embodiment, the above-described reservation mechanism also enables direct reservation of the channel for a period of time (e.g., up to 32 ms at a time) (limited by a 16-bit NAV field), thus enabling extended continuous LTE operation if and when desired for LTE-LTE coexistence. However, while the A2TS mode of operation facilitates unlicensed LTE, there are several operational challenges (e.g., collision management, fairness, and efficiency) which may be overcome (e.g., in real world practice) using various embodiments of the present principles.

In some embodiments, with respect to collision management, channel reservations from the eNodeBs 312 may be relied upon to protect transmissions to the UEs 308 in accordance with the present principles. However, hidden WiFi terminals that may not be able to decode the CTS messages may continue to interfere with on-going LTE transmissions. This problem may be exacerbated with LTE transmitting to multiple UEs 308 in a single frame using Orthogonal Frequency Division Multiple Access (OPDMA), which may result in varying interference/collision levels at the UEs. In various embodiments, this problem may be overcome using a simple, yet effective A2TS-aware scheduling policy that minimizes the impact of interference from such hidden nodes in accordance with the present principles.

In some embodiments, with respect to fairness, the WiFi Carrier Sense Multiple Access (CSMA) mechanisms may be relied upon to fairly contend for channel access in accordance with the present principles. However, WiFi contention window size parameters are conventionally appropriately chosen only for typical one-to-one WiFi transmissions. Hence, using the same contention parameters for an extended, one-to-many client transmission will result in starvation of the WiFi devices, and possible lost connections. In various embodiments, this problem may be overcome using an A2TS-aware back-off mechanism designed to maintain fair-sharing of the channel with WiFi in accordance with the present principles.

In some embodiments, with respect to efficiency, due to the limitations of the NAV field size in WiFi, each CTS can only reserve the channel for 32 ms. Under LTE-to-LTE coexistence, where longer on-durations are preferred, this is not desirable, as it limits the performance of LTE. Resolving this performance issue is made more challenging because to remain standards-compliant, no changes to the LTE and WiFi Physical Layer (PHY) may be performed. Hence, a custom PHY-layer coordination mechanism between the LTE and WiFi interfaces on the same eNodeB is not possible using conventional systems and current standards.

In some embodiments, to overcome this performance issue while remaining standards compliant (e.g., no changes to either LTE or WiFi standards), novel reservation extension system and method may be employed to achieve longer reservation durations without introducing any gaps into the unlicensed transmission in accordance with various embodiments of the present principles. As the system and method according to the present principles are fully compatible with existing standards, it may be readily deployed in any existing (or future) system (e.g., LTE-U/LAA-LTE small-cell platform) in accordance with various embodiments.

Under current LTE-U/LAA-LTE specifications, unlicensed carriers can be used in two forms, (a) downlink-only transmissions using Frequency Division Duplexing (FDD) LTE, or (b) uplink and downlink transmissions using Time Division Duplexing (TDD) LTE. Conventionally, uplink-only component carriers are not supported In some embodiments. LTE networks 302 may be brought into the WiFi space 306 using the A2TS protocol design (described above), which is fully compatible with LTE, and thus also compatible with the current industry interest in LTE-U and LAA-LTE protocols. However, LAA-LTE devices do not yet exist while LTE-U is compatible with the existing LTE framework. Hence, die present principles will be described with respect to LTE-U in downlink-only unlicensed channels. However, it is to be appreciated that emphasize that the system and method according to the present principles, including the A2TS protocol are equally applicable to LAA-LTE and any other LTE frameworks in accordance with various embodiments.

In an exemplary embodiment, an LTE frame may have a duration of 10 ms and may be divided into 10 subframes (each 1 ms long). Each subframe may be partitioned into multiple resource blocks (RBs), which may then be divided into several types of channels in accordance with the present principles. These channels may include, for example, (i) control channels that are used for exchanging control information (e.g., resource assignments) between the eNodeB 312 and the UEs 308; (b) data channels that carry data payloads; and (c) reference signals that are used by the UEs 308 for synchronization and data decoding. In some embodiments, LTE can aggregate up to five distinct spectrum bands (e.g., component carriers, (CCs)) into a single composite channel. Each CC may be used for either uplink or downlink traffic, and can be centered in either the unlicensed or licensed spectrum in accordance with various embodiments of the present principles.

Note that there are no conventional/commercially available eNodeBs and UEs that operate in the unlicensed spectrum. Thus, an LTE testbed 300 configured to achieve unified WiFi and LTE interaction through a novel bi-directional RF bridge 304 between the two networks 302, 306 is illustratively depicted in accordance with an embodiment of the present principles. This bi-directional RF Bridge 304 may send LTE signals into the WiFi channel, and vice versa, all with negligible forwarding latency. Thus, the dynamic interactions between WiFi and LTE may be analyzed and/or accounted for when operating in the same frequency bands in accordance with various embodiments of the present principles.

In one embodiment, the testbed architecture 300 may include three main components: the LTE network 302, the WiFi network 306, and the RF bridge 304. The LTE 302 and WiFi 306 networks may operate at separate frequencies, and for illustrative purposes, in this embodiment, Band 13 and Channel 36 may be employed for LTE 302 and WiFi 306 networks, respectively in accordance with the present principles.

In one embodiment, the LTE network 302 may include, for example, a commercial Single-Input/Single-Output (SISO) LTE Release 8 small-cell eNodeB 312 with a transmit power of up to 1 W, along with several (e.g., up to 5) off-the-shelf UE Pantech USB dongles for UEs 308. The small-cell eNodeB 312 may employ 10 MHz FDD LTE uplink and downlink channels in LTE Band 13 in this illustrative embodiment. A splitter 310 may be attached to an active antenna port on the eNodeB 312, and one output port of the splitter 310 may be connected to a 3 dBi omni-antenna 301, while the other port may be connected to the RF bridge 304 via an RF cable 303 in accordance with the present principles.

In one embodiment, the WiFi network 306 may be, for example, a 20 MHz 802.11a SISO WiFi network 306 in the 5 GHz band. For illustrative purposes, the use of two different WiFi network setups is presented herein below, although only one setup is used at any time. A first type of WiFi network 306 setup that may be employed is a Wireless Open-Access Research Platform v3 (WARPv3) setup. In one embodiment, LTE measurements may be obtained using WARPv3 and the 802.11 Reference Design v1.2 in accordance with the present principles.

In accordance with various embodiments, the WARPv3 provides more detailed performance statistics than can be obtained from commercial WiFi devices. One of the WARPv3 boards may be configured as an AP 324, while several (e.g., up to 5) other WARPv3 boards may be employed as STAs (e.g., WiFi clients (e.g., laptop, mobile phone, etc.). In one embodiment, a splitter 322 may be connected to an active antenna port of the WARPv3 AP 324, and one of the splitter outputs may be connected to, for example, a 3 dBi WiFi omni-antenna 301, while another port may be connected to ab RF bridge 304 via an RF cable 303 in accordance with the present principles.

In another embodiment, an alternative WiFi network 306, built using, for example, off-the-shelf IT-Link WiFi devices, may be employed in accordance with the present principles. In an illustrative embodiment, a TP-Link TL-WDN4800 PCIe WiFi card, installed on a desktop PC, may be employed as an AP 324, and other TL-WN821N WiFi dongles may be employed as STAs 320, and a splitter 322 may be connected to an active antenna port on die AP 324 in accordance with the present principles. This network setup may be a drop-in replacement for the WARPv3 network, and the TP-Link platform is described as an example to demonstrate that the present principles are applicable over unmodified WiFi hardware in accordance with various embodiments.

Although the present principles are described herein with respect to the above types of WiFi and LTE Network Configurations, it is to be appreciated that the present principles may be applied to enable LTE/WiFi coexistence in a plurality of different types of network configurations in accordance with various embodiments.

In one embodiment, in- and quadrature phase (I/Q) forwarding may be performed at the RF bridge 304, using, for example, two Universal Software Radio Peripheral (USRP) 314, 318 to forward LTE and WiFi interference between the two networks 302, 306 in accordance with the present principles. Each USRP 314, 318 may include, for example, two CBX-120 RF daughterboards (not shown). In the LTE-to-WiFi bridge, one RF daughterboard at a USRP may be connected to the splitter 310 port on the LTE eNodeB 312 via an RF cable, while the other RF board may be connected to a 3 dBi omni-antenna 301 in accordance with various embodiments.

In an illustrative embodiment, the LTE-to-WiFi bridge 304 may sample the 10 MHz downlink LTE channel from the eNodeB 312 at 46.08 MHz. This is exactly three times the sampling rate of a 10 MHz LTE channel in this embodiment. This over-sampled data may then be immediately transmitted by the other RF daughter-board into the 5 GHz WiFi network. The spectrum power characteristics (and thus, the interference behavior) of the LTE signal is maintained after bridging into the WiFi network in accordance with various embodiments. The bridge 304 may induce phase offsets into the forwarded signal, but this may not affect the testbed (or real world network functionality), as the forwarded LTE signal may not be decoded on the WiFi network in accordance with the present principles. In some embodiments, frequency and time synchronization across both USRPs 314, 318 is maintained by using a common reference clock source 316.

A similar design may be employed for the WiFi-to-LTE bridge, except that a 50 MHz sampling rate (2.5× oversampling) may be used instead to forward WiFi signals in accordance with the present principles. In some embodiments, each bridge (LTE-to-WiFi and WiFi-to-LTE) may forward signals directly obtained from the eNodeB 312 and WiFi AP 324, respectively, over an RF cable 303. Hence, no cyclic RF bridging may not be performed, and LTE signals forwarded into the WiFi network 306 may not be subsequently forwarded back into the LTE network 302.

In some embodiments, bridging latency may be present during data transmission using the RF bridge 304 in both the WiFi-to-LTE (e.g., 306-304-302) and LTE-to-WiFi (e.g., 302-304-306) bridges. For illustrative purposes, it may be assumed for this example that each bridge has a bridging latency of 250 μs. The latency may impact data transport in several areas of data transport, including, for example, (i) the small-scale time-gaps in the data and control resource blocks (RBs), and (ii) the large-scale gaps from the activation/deactivation of the LTE component carriers (CCs), which will be described in further detail herein below.

In some embodiments, small-scale time-gaps may be present, and may impact both LTE-to-WiFi and WiFi-to-LTE latency during data transport. For example, for illustrative purposes, it may be assumed that a 250 μs LTE-to-WiFi latency is present when the downlink LTE channel is forwarded into the WiFi network 306. Consider, for example, the case where a time gap exists in the LTE channel. WiFi will infer a clear-channel during this gap and begin its transmission. Due to the bridging latency, this gap will appear 250 μs later in the WiFi channel. However, this may have no impact on WiFi measurements, as the performance of WiFi is dependent on the channel state, which is still preserved here albeit with a fixed delay.

In this embodiment, the WiFi-to-LTE bridge may similarly be assumed to incur a 250 μs bridging delay. This implies that the effect of WiFi on LTE sees a total delay of 500 μs. However, this delay has limited effect on the interference impact that WiFi has on LTE. For example, consider that a typical 1.5 KB 802.11a WiFi transmission has an airtime of 280 μs (232 μs DATA+16 μsSIFS+32 μs ACK) at the highest rate of 54 Mbps. This airtime will increase at lower bitrates and with frame aggregation. In some embodiments, time gaps in LTE networks may always be less than or equal to 220 μs, with a median duration under 140 μs. Hence, it is highly likely a WiFi transmission that starts in the gap will interfere with an LTE frame during data transport.

In one embodiment, large-scale gaps (e.g., several ms) may be caused from the activation/deactivation of the LTE component carriers (CCs) in accordance with the present principles. The impact of the latency may be more significant, and result in a large scale impact when, for example, LTE is duty cycled. In particular, the forwarding latency may cause a mismatch (e.g., delay) between the actual activation time of the LTE CCs, and the time at which this activation is seen by WiFi. This delay may result in additional, and unwarranted LTE-WiFi collisions when the LTE CC is enabled. Similar effects have been observed in the impact of USRP communication delays on WiFi CSMA behavior. However, an overwhelming majority of LTE-WiFi collisions are due to small-scale time-gaps in the LTE sub frames during data transport in accordance with various embodiments of the present principles.

Figure 4:
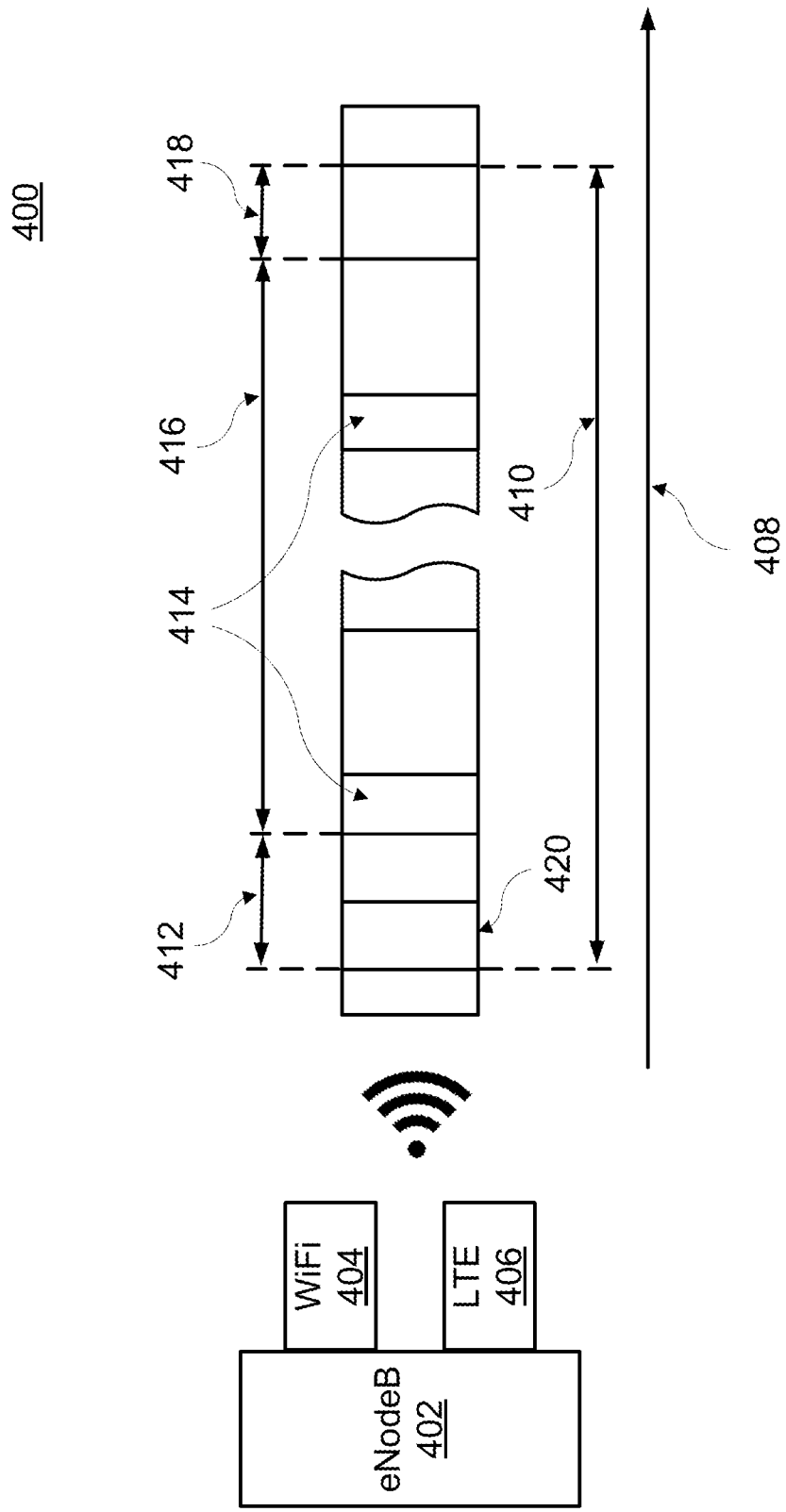
FIG. 4 shows a diagram of a system/method for data transport with Long Term Evolution (LTE)/WiFi coexistence using component carriers, in accordance with an embodiment of the present principles.

Referring now to FIG. 4, a diagram of a system/method 400 for data transport with long Term Evolution (LTE)/WiFi coexistence using component carriers is illustratively depicted in accordance with an embodiment of the present principles.

In some embodiments, LTE gaps 412, 418 may arise due to predetermined control and data allocations that go unused. Hence, it appears that these gaps can be easily eliminated in two ways: (i) by transmitting random data in all unused/null control and data RBs, and (ii) by removing the control channel completely from the unlicensed secondary component carriers (CCs) (e.g., keeping them only in licensed primary CCs). However, these approaches have several limitations and issues.

A first limitation may include, for example, (Control) Limited User Multiplexing. The size of the control channel 414 may directly affects the number of UEs that can be scheduled in a particular subframe during an LTE transmission 416. In some embodiments, all the control channels 414 may be moved from secondary CCs to the primary CCs, this will significantly limit the number of UEs that can be scheduled in all the CCs, thereby reducing user diversity gains and leading to increased latencies. The rapidly growing class of low bandwidth UEs (e.g., Internet of Things (IoT) devices), may thus be significantly impacted.

A second limitation may include, for example, (Control) Inter-Cell Coordination. Multiple LTE eNodeBs (cells) from the same operator will operate in the same unlicensed carrier. In this situation, operators employ fractional frequency reuse (PER) for interference-free operation of vulnerable cell-edge clients FFR ensures that adjacent cells will only utilize non-overlapping RBs for their cell-edge UEs. However, if the control channel is not suppressed (or orthgonalized), then these UEs will still suffer from control channel interference.

A third limitation may include, for example, (Data) Non-Uniform Interference. It is challenging to ensure that all data RBs are filled in the face of traffic burstiness and client heterogeneity. However, a more significant challenge comes from the fact that LAA-LTE supports both uplink and downlink transmissions in die same frequency band when deployed in TDD mode. Even if all resource blocks (RBs) are utilized in the downlink channel, gaps 412, 418 may still be present during the uplink subframes. Each uplink UE will only transmit on the set of RBs that has been allocated to it. Hence, the aggregate uplink interference power at any WiFi node is time-varying and dependent on the spatial topology of the UEs. Hence, the eNodeB 402 may not completely prevent transmission gaps at any WiFi/LTE device.

In one embodiment, a fundamental difference between the channel access modes of WiFi 404 (e.g., distributed and asynchronous) and LTE 406 (centralized and synchronous) may be accounted for in accordance with die present principles to enable seamless, efficient coexistence. The coexistence may be realized by enabling the LTE node to access asynchronously but transmit synchronously (A2TS) in the un-licensed spectrum. The WiFi nodes may remain unchanged. This hybrid mode of LTE operation (e.g., A2TS) enables the LTE nodes to contend for channel access asynchronously in a manner that is fair to other WiFi nodes, while remaining compliant with the synchronous specifications of LTE.

In accordance with various embodiments, a key feature for data transport with LTE/WiFi coexistence is maintaining compatibility with both LTE-U and LAA-LTE (and other LTE) in accordance with the present principles. Furthermore, the growing trend of LTE small cells with multiple interfaces (e.g., LTE, 406 WiFi 404) may be leveraged during data transport to enable coexistence. Specifically, for each unlicensed CC that is accessed, a supplementary WiFi interface may be employed on the same channel only for the purpose of channel contention/access. Once the WiFi interface gains access to the channel, it reserves the channel for a particular channel reservation temporal period 410, and may employ a CTS-to-self frame 420 with an appropriate network allocation vector (NAV) value in accordance with the present principles. The WiFi interface then relinquishes the channel to the LTE interface, and the unlicensed CC on that channel for downlink transmissions to the UEs over time 418.

In some embodiments, a channel may be reserved before the LTE transmission 416 begins, and since LTE transmissions must start and stop on a subframe boundary, there may be additional unused reservation time (e.g., up to 1 ms) at the beginning and end of the reservation duration. By complementing LTE with WiFi based sensing and notification, LTE transmission gaps 412, 418 as well as help WiFi/LTE devices detect interference with high sensitivity. However, TALOS must over-come three challenges towards a practical realization: collisions, fairness and efficiency. While the present principles are applicable to both downlink and uplink LTE transmissions, for simplicity of illustration, only data transport with respect to downlink will be described herein.

In some embodiments, collisions may occur during A2TS-Aware Scheduling, and hidden terminals in asynchronous access (e.g. WiFi) networks can result in unexpected collisions at the receiver. Such problems are a significant challenge for LTE-U/LAA-LTE as multiple UEs can be concurrently scheduled on the downlink channel (e.g. described in further detail with reference to FIG. 6). Simply approximating the channel state of all UEs with that at the transmitter will result in the inferred channel status will be highly inaccurate. A key reason is that only the WiFi nodes that are within CTS-decoding range of the eNodeB 402 will suspend transmissions in response to the CTS 420 NAV information. Hence, the further away a WiFi node is from the eNodeB 402, the more likely it will interfere with ongoing downlink transmissions. As a result, different UEs will experience different levels of WiFi interference, and those closer to the eNodeB 402 are less susceptible to interference than those at the edge of the CTS 420 coverage range).

In some embodiments, access asynchronously/transmit synchronously (A2TS)-aware scheduling in accordance with the present principles addresses the above challenges through intelligent scheduling of UEs in unlicensed carriers. Broadly speaking, UEs that are more susceptible to interference may be identified by measuring their frame loss rates; and the UEs with consistently high loss rates may be scheduled on the licensed CCs, where they will not be subject to WiFi interference. This allows for interference-prone (potentially cell-edge) UEs to receive adequate protection in licensed carriers, while alleviating the interference they cause to other WiFi devices (e.g., when LTE uplink also operates in unlicensed carrier). On the other hand, those UEs that are less sensitive to interference continue to be scheduled on the unlicensed carriers.

Data to be transmitted on the unlicensed downlink carrier may be partitioned into one or more transport blocks and multiple transport blocks are transmitted in each sub-frame. The UE acknowledgements (ACKs) or negative acknowledgements (NACKs) may each transport block separately, and the eNodeB 402 tracks the acknowledgements of these transport blocks to determine the average data loss rate of each UE in a reservation period 410.

In some embodiments, existing LTE schedulers may be leveraged, which may be executed before the transmission of every subframe. Before each subframe transmission, a pre-scheduling step that sorts the set of UEs to be scheduled according to their frame loss rates may be performed in accordance with the present principles. Subframe resources in the unlicensed CC may then be assigned to the UEs in increasing order of their loss rates. The UEs that remain after all RBs are assigned are the predominantly interference-prone UEs, and these may then be scheduled in the licensed CCs in accordance with various embodiments of the present principles.

Figure 5:
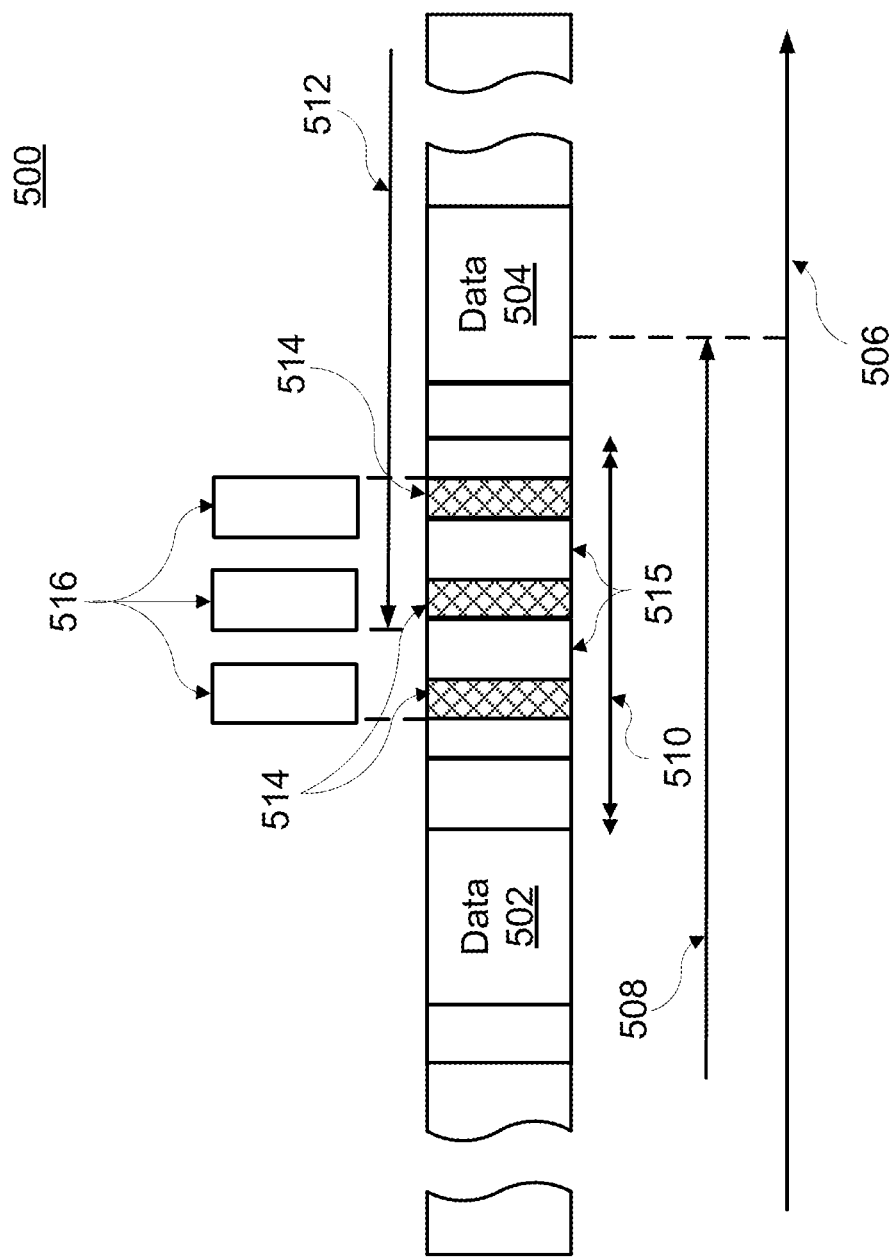
FIG. 5 shows a diagram of a system/method for data transport with Long Term Evolution (LTE)/WiFi coexistence using extendable channel reservations, in accordance with an embodiment of the present principles.

Referring now to FIG. 5, a diagram of a system/method 500 for data transport with long Term Evolution (LTE)/WiFi coexistence using extendable channel reservations is illustratively depicted in accordance with an embodiment of the present principles. In one embodiment, fairness may be enabled using A2TS-Aware contention in accordance to the present principles. For example, Carrier Sense Multiple Access (CSMA) behavior in WiFi may be influenced by the contention window and backoff policies. However, WiFi CSMA policies may not be directly applied efficiently for two reasons.

First, the WiFi channel access probability is constrained by the maximum and minimum contention window sizes, Wmax and Wmin, respectively. Existing WiFi contention window ranges are appropriate for typical WiFi frame sizes. However, each TALOS reservation duration may be appreciably longer (e.g., 1-10 ms for LAA-LTE, tens of ms for LTE-U) than a WiFi frame. If we keep the channel access probability unchanged, TALOS will occupy an unfair share of the channel, leading to starvation of the WiFi nodes.

Figure 6:
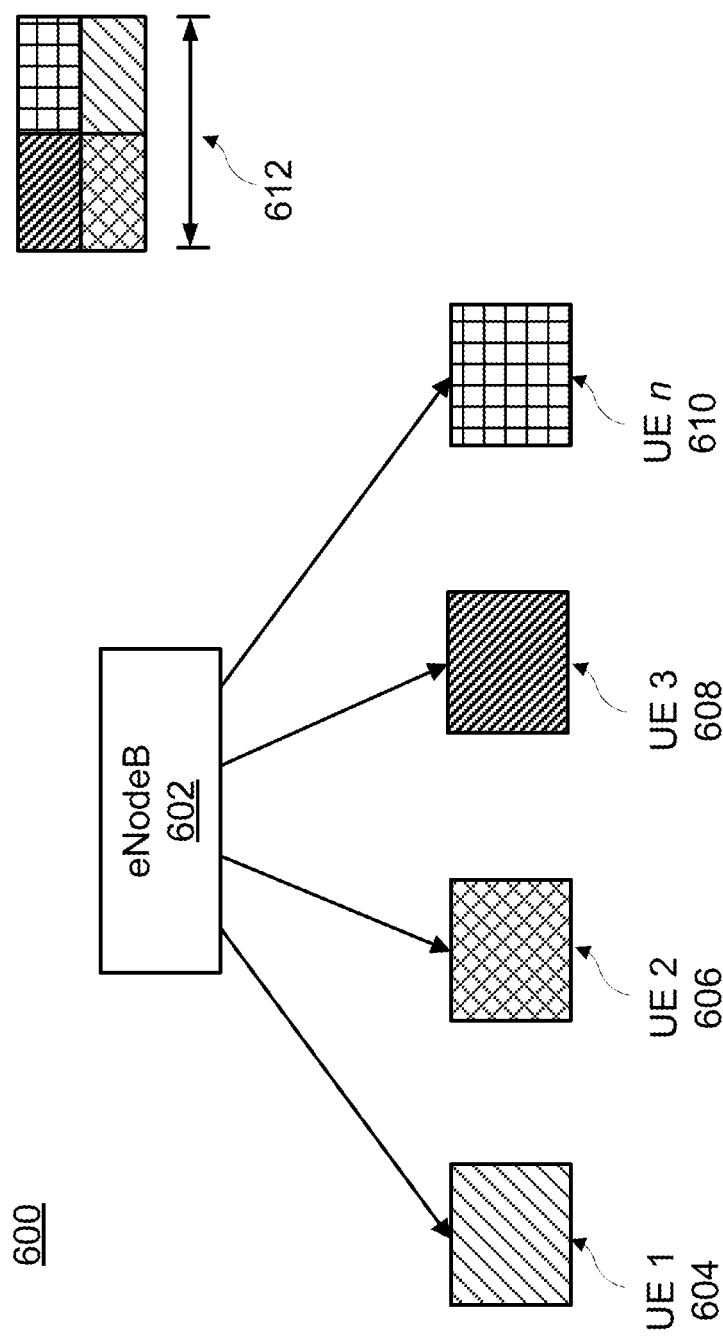
FIG. 6 shows a diagram of a system/method for data transport with multiple User Equipment/Devices (UEs) per frame, in accordance with an embodiment of the present principles.

Second, the present principles may employ a one-to-many transmission model (e.g., as shown in FIG. 6). The probability that at least one UE encounters a collision from WiFi is now significantly higher. Hence, if the system and method according to the present principles backs off even if one UE experiences a collision, then it is very likely to experience a high incidence of backoffs and may thus be starved of throughput. On the other hand, if back offs only occur when all UEs experience collisions, then it is likely to be overly-aggressive in contending for the channel, leading to unfairness for WiFi.

In some embodiments, fair channel access may be provided by scaling contention window sizes during channel reservations (e.g., 508, 512) over time 506 in accordance with the present principles. For example, compare a network with WiFi APs/STAs and LTE eNodeBs/UEs with another network where the LTE eNodeBs/UEs are replaced with WiFi APs and STAs, respectively. If the WiFi APs/STAs from the first network obtains the same throughput as in the second network, then we consider the LTE share of the channel to be fair. To enable such fair sharing, contention mechanisms may be modulated along two fronts as follows.

First, the contention window sizes may be linearly scaled. For example, let the reservation duration 508, 512 be L× the transmit airtime of a WiFi frame, and set its contention window range to [$LW_{min}$, $LW_{max}$]. The random backoff interval, b, is thus increased to b ∈ [0, $\overline{W}$], where $\overline{W}$ ∈ [$LW_{min}$, $LW_{max}$]. This linear scaling maintains throughput fairness to WiFi in accordance with the present principles.

Second, instead of doubling the contention window upon collisions, $\overline{W}$ may be increased proportionally to the subframe collision rate in accordance with various embodiments. For example, the eNodeB may maintain a Hybrid Automatic Repeat Request (HARQ) counter (e.g., value between 0 and 3) for each data packet (e.g., LTE transport block) that is scheduled during the on-period. Multiple data packets can be scheduled over an entire reservation duration for different UEs. The eNodeB may increment a HARQ counter by one upon a NACK (e.g., lack of ACK) from the UE. The average HARQ value, $\overline{H}$, of all transmitted data packets in the current reservation period may then be computed according to the present principles. If $\overline{H}$ is larger than the average HARQ from the previous period, the backoff window limit for the next reservation duration is increased to $$\hat{W} = \min\left\{\left(1 + \frac{1}{3}\overline{H}\right)\overline{W}, LW_{max}\right\}.$$

The $$\left(1 + \frac{1}{3}\overline{H}\right)$$

scaling factor ensures that the backoff increment is proportional to the loss rates of the LTE transport blocks. Otherwise, we set $\overline{W}=LW_{min}$, and the backup interval (b) may be randomly selected as follows: $b \in [0,\overline{W}]$ in accordance with the present principles.

In some embodiments, extended channel access may be provided for data transport in accordance with the present principles In the presence of little-to-no WiFi activity, LTE-to-LTE coexistence benefits from longer on-durations as existing LTE features (e.g., Radio Resource Management and UE synchronization), operate over longer timescales of, for example, hundreds of milliseconds to seconds. An even greater challenge is present if LTE-U is employed, including, for example, accounting for the overhead of enabling an unlicensed carrier is 8 ms. To overcome these, and other challenges present during data transport in a plurality of situations, the flexibility to operate for longer time durations may be provided to amortize this overhead in accordance with various embodiments of the present principles. Thus, reservation durations that exceed a particular threshold (e.g., the 32 ms permissible by the CTS-to-Self NAV field) may therefore be supported in accordance with the present principles.

In some embodiments, successive CTS-to-Self frames 516 may be employed to extend channel reservations 508, 512 over time 506 in accordance with the present principles. However, the additional CTS-to-Self packets 506 (e.g., beyond the first one) on the WiFi interface may interfere with the on-going LTE transmission on the same node. One possible option is to send the CTS packets 516 precisely at the end of the LTE transmission. However, this would require extremely tight PHY-layer synchronization between the two interfaces, which in turn would require PHY-layer changes. In the case of LTE-U, each activation may also incur the 8 ms overhead.

In some embodiments, to overcome this limitation, no data 502, 504 transmission may be scheduled in the last LTE downlink subframe of the current channel reservation 510, resulting in large time-gaps within this last subframe 510. As reference signals 514 are included (e.g., not suppressed), there is no disruption in the LTE carrier at the UEs. The contention window size of the WiFi interface may be set to zero, so that it does not backoff when presented with a chance to access the channel. When the WiFi interface detects a transmission opportunity during the empty data RBs of the last LTE subframe 510, it may immediately send\three CTS-to-Self packets 516 back-to-back, separated by SIFS duration in accordance with the present principles.

The present principles may be employed to leverage gap sizes in accordance with various embodiments. For example, in an illustrative embodiment, the smallest gap size 515 between reference signals 514 in an empty down-link LTE subframe may be 133.4 µs, while the airtime duration of a WiFi CTS frame and SIFS is 48 µs and 16 µs respectively. Hence, a transmitted CTS frame 516 can easily fit completely within the time gaps 515. By transmitting three CTS-to-Self 516 packets consecutively in accordance with the present principles, at least one of them may not interfered with by the reference/control signals 514 from the LTE transmission (without synchronizing the two interfaces) and can be received correctly at the WiFi STAs in accordance with various embodiments.

In some embodiments, after the new CTS-to-Self frames 516 have been sent, downlink subframes may continue to be sent uninterrupted on the same CC. No deactivation of the unlicensed CC on the LTE interface may be necessary during the reservation extension for channel reservations 510, 512. In some embodiments, to guard against interference to undetected WiFi devices, the maximum total channel reservation may be limited to 100 ms, which may protect against WiFi disconnections due to the loss of multiple beacon signals in accordance with the present principles.

In some embodiments, each extension for channel reservations 510, 512 may be provided such that that one subframe goes unused. Hence, the reservation overhead of this extension may depend on the duration of the reservation. For example, if an LAA-LTE reservation is extended for 32 ms each time, it will incur a mere 3.1% overhead. The overhead is even lower with LTE-U networks. If no reservation extensions are used, up to ten subframes of unused airtime may be incurred for each unlicensed CC activation. In contrast, in embodiments with channel extensions, only one subframe for each extension (e.g., last sub-frame being empty) in accordance with the present principles. The cost of the initial activation and subsequent extensions may be amortized over a larger uninterrupted CC activation duration. Hence, increased efficiency may be achieved by selecting longer LTE-U reservation durations in accordance with various embodiments of the present principles.

Referring now to FIG. 6, with continued reference to FIGS. 4 and 5, a diagram of a system/method 600 for data transport with multiple User Equipment/Devices (UEs) per frame is illustratively depicted in accordance with the present principles. In one embodiment, an eNodeB 602 may transmit to multiple UEs 604, 606, 608, 610, which may be concurrently scheduled on a downlink channel.

Simply approximating the channel state of all UEs 604, 606, 608, 610 with that at the transmitter will result in the inferred channel status will be highly inaccurate.

A key reason is that only the WiFi nodes that are within CIS-decoding range of the eNodeB 402 will suspend transmissions in response to the CTS 420 NAV information. Hence, the further away a WiFi node is from the eNodeB 602, the more likely it will interfere with ongoing downlink transmissions. As a result, different UEs 604, 606, 608, 610 may experience different levels of WiFi interference, and those closer to the eNodeB 602 may be less susceptible to interference than those at the edge of a CTS coverage range. In some embodiments. UEs 604, 606, 608, 610 may have different channel states within a same subframe 612, which may result in varying interference/collision levels at the UEs 604, 606, 608, 610 in accordance with various embodiments.

In an exemplary embodiment, the LTE frame has a duration of 10 ms and may be divided into 10 subframes (e.g., 612), each 1 ms long. Each subframe 612 may be partitioned into multiple RBs, which may then be divided into several types of channels. These channels may include, for example: (i) control channels 414 that are used for exchanging control information (e.g., resource assignments) between the eNodeB 602 and the UEs 604, 606, 608, 610; (ii) data channels 502, 504 that carry data payloads; (ii) reference signals 514 that are used by die UEs 604, 606, 608, 610 for synchronization and data decoding. LTE can aggregate up to five distinct spectrum bands (e.g., component carriers (CCs)) into a single composite channel. Each CC may be used for either uplink or downlink traffic, and can be centered in either the unlicensed or licensed spectrum in accordance with various embodiments of the present principles.

Figure 7:
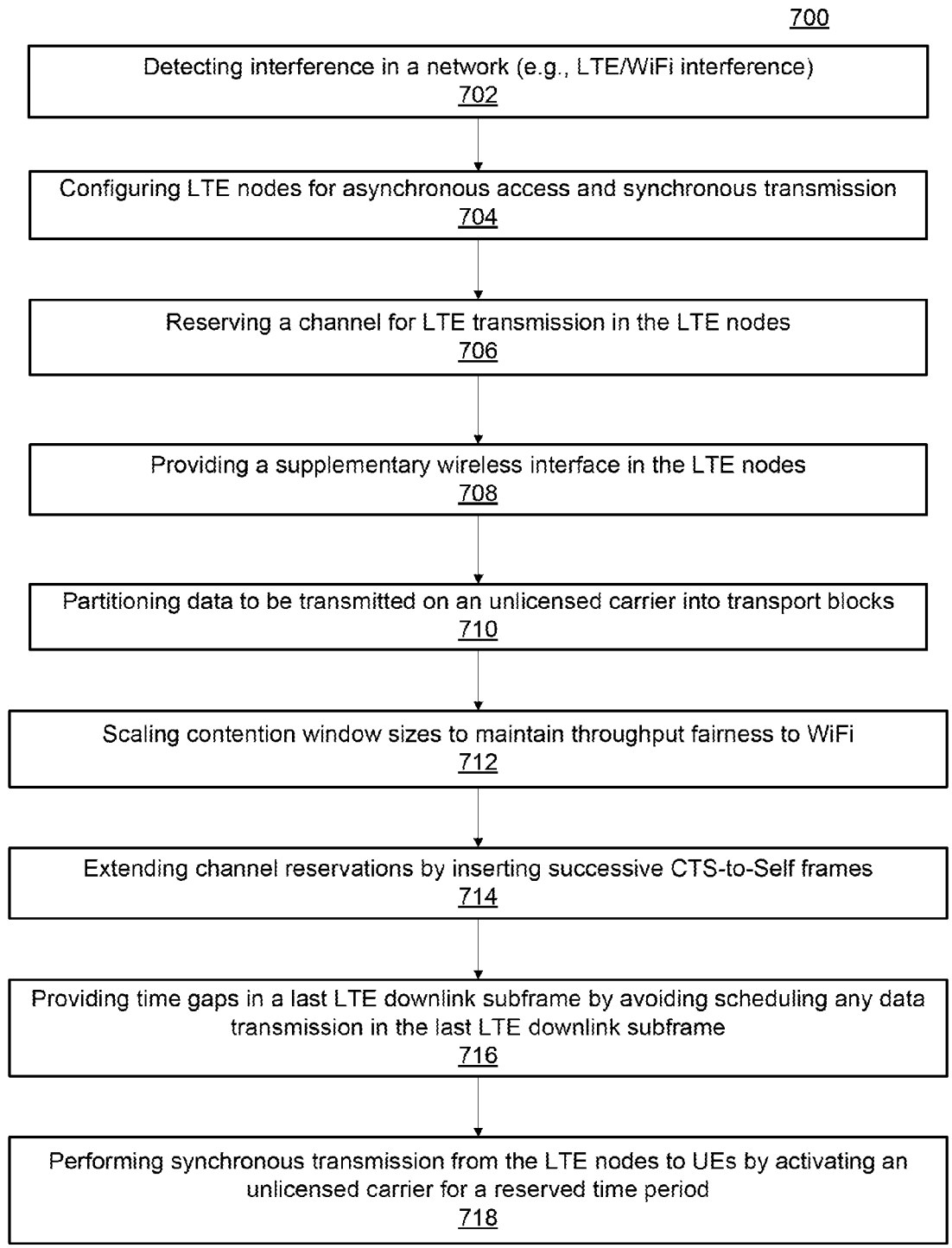
FIG. 7 shows a block/flow diagram of a method for data transport with Long Term Evolution (LTE)/WiFi coexistence, in accordance with an embodiment of the present principles.

Referring now to FIG. 7, a diagram of a method 700 (e.g., computer implemented) for data transport with Long Term Evolution (LTE)/WiFi coexistence is illustratively depicted in accordance with an embodiment of the present principles. In one embodiment, interference (e.g., LTE/WiFi interference) may be detected in a network in block 702. LTE nodes may be configured for asynchronous access and synchronous transmission in block 704, and a channel may be reserved for LTE transmission in the LTE nodes in block 706. A supplementary wireless interface may be provided in the LTE nodes on a same channel as reserved for the LTE transmission in block 708 in accordance with the present principles.

In block 710, data to be transmitted on an unlicensed carrier may be partitioned into a plurality of transport blocks, the plurality of the transport blocks being transmitted in each of one or more subframes in accordance with various embodiments of the present principles. In block 712, contention window sizes may be scaled to maintain throughput fairness to WiFi. For example, as described with respect to FIG. 5, above, let the reservation duration 508, 512 be L× the transmit airtime of a WiFi frame, and set its contention window range to $[LW_{min}, LW_{max}]$. The random backoff interval, b, is thus increased to $b \in [0,\overline{W}]$, where $\overline{W} \in [LW_{min}, LW_{max}]$. This linear scaling maintains throughput fairness to WiFi in accordance with the present principles.

In some embodiments, channel reservations may be extended in block 714 by, for example, inserting successive CTS-to-Self frames in accordance with the present principles. In block 716, time gaps may be generated in a last LTE downlink subframe by, for example, preventing scheduling any data transmission in the last LTE downlink subframe. In block 718, synchronous transmission from one or more LTE nodes to one or more UEs may be performed by activating an unlicensed carrier and transmitting data for a reserved time period in accordance with the present principles.

Figure 8:
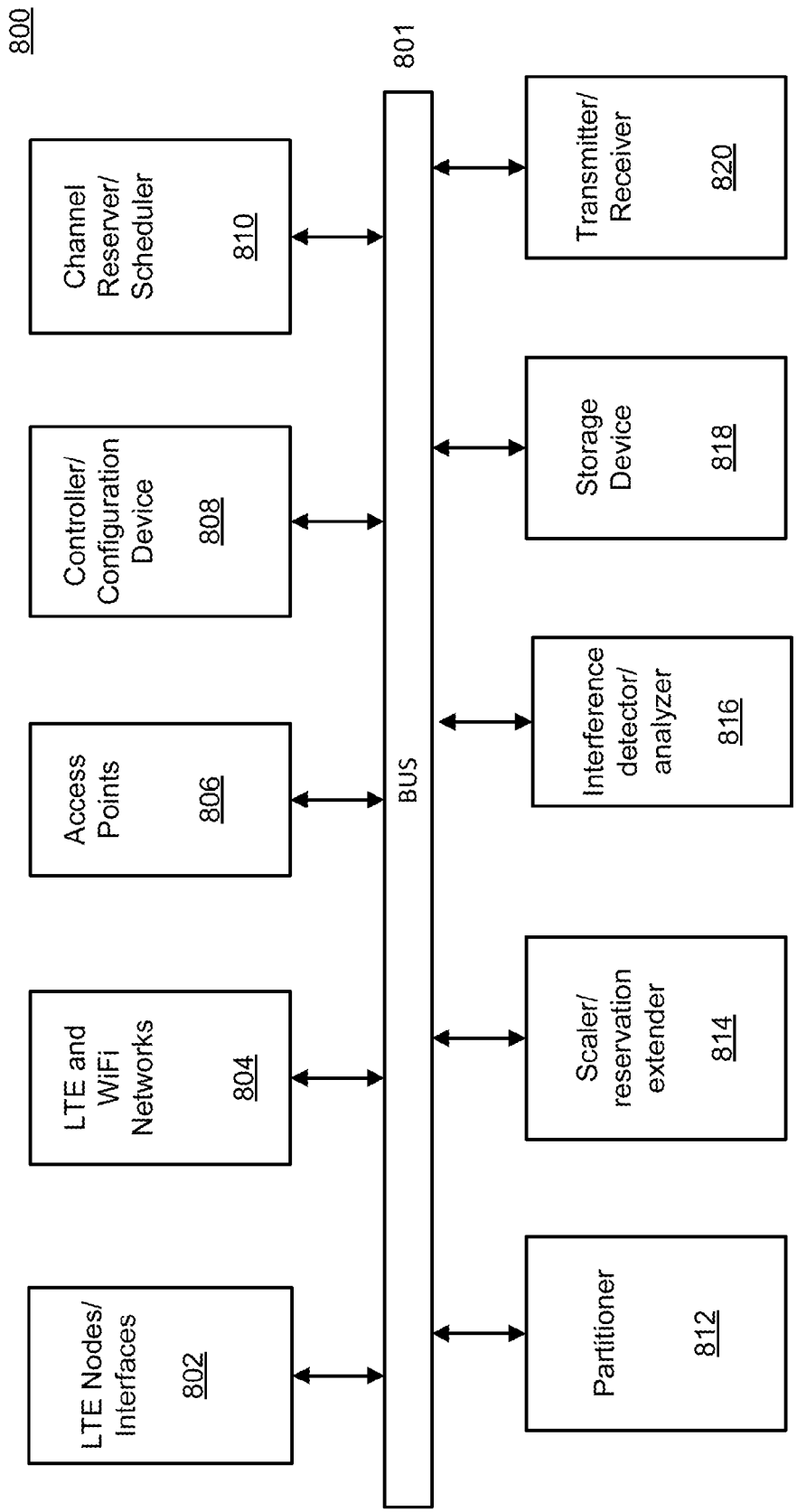
FIG. 8 shows a block/flow diagram of a system for data transport with Long Term Evolution (LTE)/WiFi coexistence, in accordance with an embodiment of the present principles.

Referring now to FIG. 8, an exemplary system for data transport with Long Term Evolution (LTE)/WiFi coexistence is illustratively depicted in accordance with an embodiment of the present principles. In one embodiment. While many aspects of system 800 are described in singular form for the sakes of illustration and clarity, the same can be applied to multiples ones of the items mentioned with respect to the description of system 800. For example, while a single transmitter and/or receiver 818 is described, more than one transmitter and/or receiver 818 can be used in accordance with the teachings of the present principles, while maintaining the spirit of the present principles. Moreover, it is appreciated that transmitter and/or receiver 818 is but one aspect involved with system 800 than can be extended to plural form while maintaining the spirit of the present principles.

The system 800 can include a bus 801, one or more LTE nodes 602, which may be connected to one or more LTE and/or WiFi Networks 804. One or more access points 806 may be employed for data transport, and a controller 808 (e.g., local or remote) may be employed to provide commands to the system 800 to, for example, provide improved LTE/WiFi coexistence during data transport in accordance with the present principles. An interference detector/analyzer 816 may be employed to, for example, determine LTE/WiFi interference levels for each of a plurality of UEs using one or more hardware sensors in accordance with various embodiments of the present principles.

In some embodiments, the LTE nodes 802 may be controlled and/or configured for asynchronous access and synchronous transmission using the controller 808, and a channel may be reserved for LTE transmission in the LTE using a channel reserver 810. A partitioner 812 may be employed to partition data to be transmitted on an unlicensed carrier into a plurality of transport blocks, the plurality of the transport blocks being transmitted in each of one or more subframes in accordance with various embodiments of the present principles.

In some embodiments, a sealer/reservation extender 814 may extend channel reservations by, for example, inserting successive CTS-to-Self frames in accordance with the present principles. Time gaps may be generated in a last LTE downlink subframe by, for example, preventing scheduling any data transmission in the last LTE downlink subframe. A storage device 818 may be employed to store various network configurations, channel information, system commands, etc., and one or more transmitters and/or receivers 820 may be employed to, for example, provide asynchronous transmission from one or more LTE nodes to UEs by activating an unlicensed carrier and transmitting data for a reserved time period in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for improving Long Term Evolution (LTE)-WiFi coexistence in a network, comprising:

configuring one or more LTE nodes for asynchronous access and synchronous transmission to bridge LTE and WiFi access modes;

reserving a channel for LTE transmission in the one or more LTE nodes;

providing a supplementary WiFi module in the one or more LTE nodes for sensing the channel for occupancy and for broadcasting a reservation signal on the channel prior to the LTE transmission;

scaling contention window sizes linearly by increasing the contention window sizes proportionally to a subframe collision rate to maintain throughput fairness to the WiFi; and performing synchronous transmission from the one or more LTE nodes to one or more User Devices (UEs) by activating the unlicensed carrier for a reserved time period.

2. The method of claim 1, further comprising identifying UEs to schedule on unlicensed carriers by measuring frame loss rates for each UE to determining a susceptibility of the UE to interference.

3. The method of claim 1, wherein the reserved time period is a duration of the LTE transmission.

4. The method of claim 1, wherein the reservation signal broadcast from the WiFi module includes a Clear-to-Send (CTS)-to-Self packet with a Network Allocation Vector (NAV) field set to a duration of the LTE transmission.

5. The method of claim 1, wherein the WiFi module at the one or more LTE node senses the channel for on-going transmissions to determine an appropriate time to initiate the LTE transmission.

6. The method of claim 1, further comprising sorting a set of a plurality of the UEs according to frame loss rates of individual UEs.

7. The method of claim 6, wherein subframe resources in an unlicensed control carrier are assigned to the UEs in increasing order of the frame loss rates of individual UEs.

8. The method of claim 1, further comprising extending a channel reservation by inserting successive Clear-to-Send (CTS)-to-Self frames.

9. The method of claim 1, further comprising providing time gaps in a last LTE downlink subframe by avoiding scheduling any data transmission in the last LTE downlink subframe.

10. A system for improving Long Term Evolution (LTE)-WiFi coexistence in a network, comprising:
one or more LTE nodes configured for asynchronous access and synchronous transmission to bridge LTE and WiFi access modes;
a channel scheduler for reserving a channel for LTE transmission in the one or more LTE nodes;
a supplementary WiFi module in the one or more LTE nodes for sensing the channel for occupancy and for broadcasting a reservation signal on the channel prior to the LTE transmission;
a scaler for scaling contention window sizes linearly by increasing the contention window sizes proportionally to a subframe collision rate to maintain throughput fairness to the WiFi; and
a transmitter for performing synchronous transmission from the one or more LTE nodes to one or more User Devices (UEs) by activating the unlicensed carrier for a reserved time period.

11. The system of claim 10, further comprising an interference detector for identifying UEs to schedule on unlicensed carriers by measuring frame loss rates for each UE to determining a susceptibility of the UE to interference.

12. The system of claim 10, wherein the reserved time period is a duration of the LTE transmission.

13. The system of claim 10, wherein the reservation signal broadcast from the WiFi module includes a Clear-to-Send (CTS)-to-Self packet with a Network Allocation Vector (NAV) field set to a duration of the LTE transmission.

14. The system of claim 10, wherein the WiFi module at the one or more LTE node senses the channel for on-going transmissions to determine an appropriate time to initiate the LTE transmission.

15. The system of claim 10, wherein the channel scheduler is further configured to sort a set of a plurality of the UEs according to frame loss rates of individual UEs.

16. The system of claim 15, wherein subframe resources in an unlicensed control carrier are assigned to the UEs in increasing order of the frame loss rates of individual UEs.

17. The system of claim 10, wherein the scaler is further configured to extend a channel reservation by inserting successive Clear-to-Send (CTS)-to-Self frames.

18. The system of claim 10, wherein the channel scheduler is further configured to provide time gaps in a last LTE downlink subframe by avoiding scheduling any data transmission in the last LTE downlink subframe.

19. A non-transitory computer-readable storage medium comprising a computer-readable program for improving Long Term Evolution (LTE)-WiFi coexistence in a network, wherein the computer-readable program when executed on a computer causes the computer to perform the steps of:
configuring one or more LTE nodes for asynchronous access and synchronous transmission to bridge LTE and WiFi access modes;
reserving a channel for LTE transmission in the one or more LTE nodes;
providing a supplementary WiFi module in the one or more LTE nodes for sensing the channel for occupancy and for broadcasting a reservation signal on the channel prior to the LTE transmission;
scaling contention window sizes linearly by increasing the contention window sizes proportionally to a subframe collision rate to maintain throughput fairness to the WiFi; and
performing synchronous transmission from the one or more LTE nodes to one or more User Devices (UEs) by activating the unlicensed carrier for a reserved time period.

20. The computer-readable storage medium of claim 19, further comprising identifying UEs to schedule on unlicensed carriers by measuring frame loss rates for each UE to determining a susceptibility of the UE to interference.

* * * * *